(12) United States Patent
Marutani et al.

(10) Patent No.: US 8,534,262 B2
(45) Date of Patent: Sep. 17, 2013

(54) FUEL INJECTION METHOD FOR DIESEL ENGINE AND DIESEL ENGINE

(75) Inventors: Youichi Marutani, Tokyo (JP); Yasunori Ashikaga, Tokyo (JP); Takayuki Yamada, Tokyo (JP); Mamoru Kurashina, Matsumoto (JP)

(73) Assignee: IHI Corporation, Tokyo (JP)

( * ) Notice: Subject to any disclaimer, the term of this patent is extended or adjusted under 35 U.S.C. 154(b) by 701 days.

(21) Appl. No.: 12/747,646

(22) PCT Filed: Nov. 5, 2008

(86) PCT No.: PCT/JP2008/003181
§ 371 (c)(1),
(2), (4) Date: Jun. 11, 2010

(87) PCT Pub. No.: WO2009/075055
PCT Pub. Date: Jun. 18, 2009

(65) Prior Publication Data
US 2010/0294234 A1   Nov. 25, 2010

(30) Foreign Application Priority Data

Dec. 13, 2007 (JP) ................................. 2007-322311

(51) Int. Cl.
*F02B 3/00* (2006.01)
*F02B 5/00* (2006.01)

(52) U.S. Cl.
USPC .......................................... 123/299; 123/305

(58) Field of Classification Search
USPC ................. 123/298, 299, 300, 301, 302, 303, 123/304, 305, 470, 600
See application file for complete search history.

(56) References Cited

U.S. PATENT DOCUMENTS

| 5,943,993 | A | * | 8/1999 | Carstensen et al. | ........... 123/298 |
| 6,443,122 | B1 | * | 9/2002 | Denbratt et al. | ............... 123/301 |
| 6,705,275 | B2 | * | 3/2004 | Fukuzumi | ..................... 123/295 |
| 6,725,828 | B1 | * | 4/2004 | Han et al. | ........................ 123/295 |
| 7,418,940 | B1 | * | 9/2008 | Yi et al. | ......................... 123/295 |
| 2010/0147261 | A1 | * | 6/2010 | Yamaguchi et al. | ........... 123/295 |

FOREIGN PATENT DOCUMENTS

| DE | 198 04 161 A1 | 8/1998 |
| EP | 0 651 151 A1 | 5/1995 |
| EP | 0 937 890 A2 | 8/1999 |
| EP | 0 937 890 A3 | 8/1999 |
| JP | 115540 | 4/1936 |

(Continued)

OTHER PUBLICATIONS

Extended Search Report issued Jul. 4, 2011 in European Patent Application No. 08860579.5-1263 / 2233716.

*Primary Examiner* — Stephen K Cronin
*Assistant Examiner* — Sizo Vilakazi
(74) *Attorney, Agent, or Firm* — Oblon, Spivak, McClelland, Maier & Neustadt, L.L.P.

(57) ABSTRACT

In a diesel engine 1 with fuel injection valves 6a and 6b for injecting fuel 5a, 5b into a combustion chamber 4, respectively, the valves 6a and 6b are arranged such that they are opposed to each other horizontally and diametrically of the combustion chamber 4 in a plan view and are out of alignment in height to each other axially of a cylinder 2. With the valves 6a and 6b being positioned close to and away from the cylinder head 7, respectively, an upper surface of the piston 3 has a rising gradient extending from its side adjacent to the valve 6b toward its side adjacent to the valve 6a up to diametrically halfway of the piston 3.

2 Claims, 3 Drawing Sheets

(56) References Cited

FOREIGN PATENT DOCUMENTS

| | | |
|---|---|---|
| JP | 60-187714 | 9/1985 |
| JP | 61-207816 | 9/1986 |
| JP | 4-75158 | 6/1992 |
| JP | 10-227218 | 8/1998 |
| JP | 10-252608 | 9/1998 |
| JP | 2003-65169 | 3/2003 |
| JP | 2003-172144 | 6/2003 |
| JP | 2003-328762 | 11/2003 |
| JP | 2004-537004 | 12/2004 |
| JP | 2007-231913 | 9/2007 |
| JP | 2007-255291 | 10/2007 |
| WO | WO 03/014559 A1 | 2/2003 |

* cited by examiner

FUEL INJECTION METHOD FOR DIESEL ENGINE AND DIESEL ENGINE

TECHNICAL FIELD

The present invention relates to a fuel injection method for a diesel engine and a diesel engine.

BACKGROUND ART

In a diesel engine, reduction of $NO_x$ and particulate matter (PM) in exhaust gas has been demanded. In a conventional diesel engine, when a piston reaches a vicinity of an upper dead center in a compression stroke, fuel is injected by fuel injection valves into atomization in a combustion chamber where the atomized fuel is mixed with air taken in through a suction valve to produce a fuel-air mixture which attains its ignition temperature through compression of the combustion chamber to burn.

Conventionally, in order to reduce $NO_x$ in exhaust gas in such diesel engine, injection pressure of the fuel in, for example, an initial stage of fuel injection is reduced to reduce an amount of air (oxygen) to be mixed with the fuel. As a result, vigorous combustion of the fuel in the initial stage of fuel injection is suppressed to prevent flame temperature from being increased, thereby suppressing production of $NO_x$ in exhaust gas.

A conventional diesel engine is disclosed, for example, in Patent Literature 1. Also in the Patent Literature 1, injection pressure of fuel is reduced to prevent excessive oxygen from being introduced into the fuel to thereby suppress production of $NO_x$ in exhaust gas.

[Patent Literature 1] JP 2003-65169A

SUMMARY OF INVENTION

Technical Problems

However, even if injection pressure of the fuel is reduced as mentioned in the above, the fuel is atomized to some extent so that air is admixed in the injected fuel to produce a fuel-air mixture, failing to sufficiently suppress increase of flame temperature. Thus, reduction of $NO_x$ in exhaust gas may be insufficient. Moreover, insufficient atomization of the fuel due to the reduced injection pressure may disadvantageously deteriorate the combustion to increase particulate matter in exhaust gas. It is considered that such problems are also brought about in the diesel engine of the Patent Literature 1.

The invention was made in view of the above and has its object to provide a fuel injection method for a diesel engine and a diesel engine capable of reducing $NO_x$ and particulate matter in exhaust gas.

Solution to Problems

The invention is directed to a fuel injection method for a diesel engine with fuel injection valves for injection of fuel into a combustion chamber, which comprises injecting the fuel crosswise of the combustion chamber from the plural fuel injection valves arranged horizontally and diametrically oppositely of the combustion chamber in a plan view and arranged out of alignment axially of the combustion chamber, the fuel injected from the fuel injection valve close to a cylinder head colliding with the fuel injected from the fuel injection valve away from the cylinder head to rise along a slant on a piston with a rising gradient from a side adjacent to the fuel injection valve away from the cylinder head toward a side adjacent to the fuel injection valve close to the cylinder head up to diametrically halfway of the piston when the piston is in a vicinity of an upper dead center during a compression stroke, the fuel injected from the respective fuel injection valves advancing toward opposing wall portions in the combustion chamber when the piston is lowered by a predetermined amount during an expansion stroke.

The invention is also directed to a diesel engine with fuel injection valves for injection of fuel into a combustion chamber, comprising the fuel injection valves arranged horizontally and diametrically oppositely of the combustion chamber in a plan view and arranged out of alignment axially of the combustion chamber, and a piston with an upper surface having a rising gradient extending from a side adjacent to the fuel injection valve away from a cylinder head toward a side adjacent to the fuel injection valve close to the cylinder head up to diametrically halfway of the piston.

Advantageous Effects of Invention

A fuel injection method for a diesel engine and a diesel engine according to the invention exhibit excellent effects that, in the initial stage of fuel injection, the involvement of air into the fuel is restricted so that flame temperature is prevented from being enhanced and $NO_x$ in the exhaust gas can be reduced and that, in the late stage of fuel injection, air can be sufficiently involved into the injected fuel so that the combustion becomes satisfactory to reduce the particulate matter.

Figure 1:
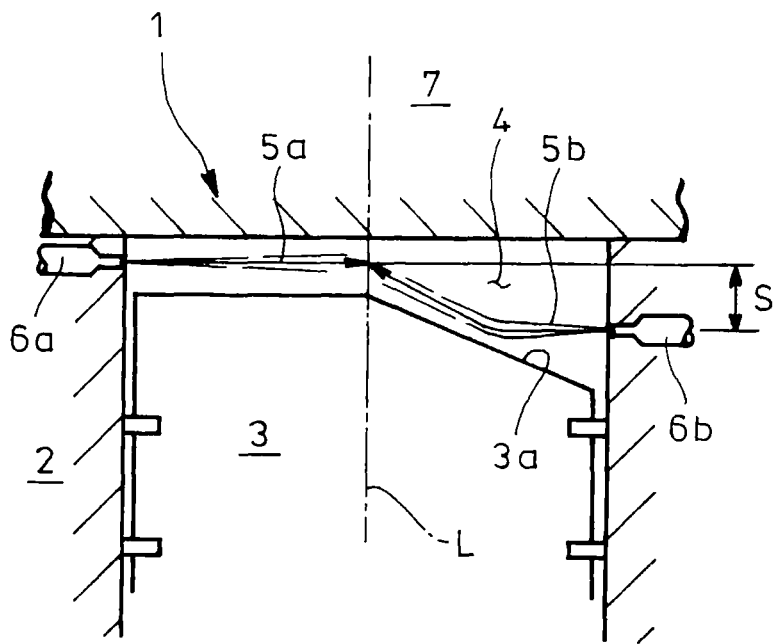
FIG. 1 shows a front view in section of an embodiment of a fuel injection method for a diesel engine and a diesel engine according to the invention in an initial stage of fuel injection where a piston is in a vicinity of an upper dead center.

REFERENCE SIGNS LIST 1 diesel engine
2 cylinder
3 piston
3a. bevel
4 combustion chamber
5a. fuel
5b. fuel
6a. fuel injection valve
6b. fuel injection valve
7 cylinder head

DESCRIPTION OF EMBODIMENT

An embodiment of the invention will be described in conjunction with the attached drawings.

FIGS. 1-6 shows the embodiment of the invention.

In the figures, reference numeral 1 denotes a diesel engine. The diesel engine 1 comprises a cylinder 2, a piston 3 slidably arranged in the cylinder 2 for reciprocal movements in the cylinder 2, two fuel injection valves 6a. and 6b. for injection of fuel 5a, 5b. into a combustion chamber 4 at an upper portion of the cylinder 2 from diametrically outwardly, and openable and closable suction and exhaust valves (not shown) attached to a cylinder head 7.

Figure 5:
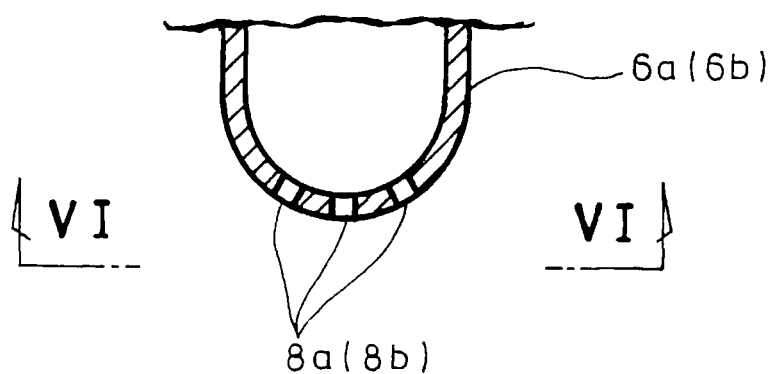
FIG. 5 is a horizontal section schematically showing a tip of a fuel injection valve.
Figure 6:
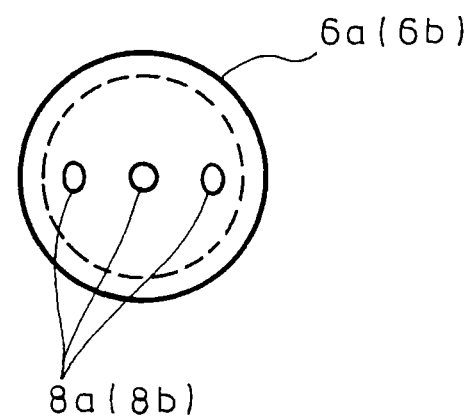
FIG. 6 is a view looking in the direction of arrows VI in FIG. 5.

The fuel injection valves 6a. and 6b. are arranged circumferentially of the cylinder 2 and with a 180° phase shift to each other about an axis L of the cylinder 2 (combustion chamber 4) and with a height difference by distance S to each other in a direction parallel to the axis L; the fuel injection valves 6a. and 6b. are formed at their tips with a plurality of nozzle holes 8a. and 8b, respectively, for example at a central and lateral positions as shown in FIGS. 5 and 6. An upper surface of the piston 3 has a rising gradient from its side adjacent to the fuel injection valve 6b, positioned away from the cylinder head 7, toward its side adjacent to the fuel injection valve 6a, positioned close to the cylinder head 7, said rising gradient extending up to a vicinity of a center O of the piston 3 to thereby provide a slant 3a with a slant angle α of about 15°-25°.

Next, a mode of operation of the above-mentioned embodiment will be described.

Figure 2:
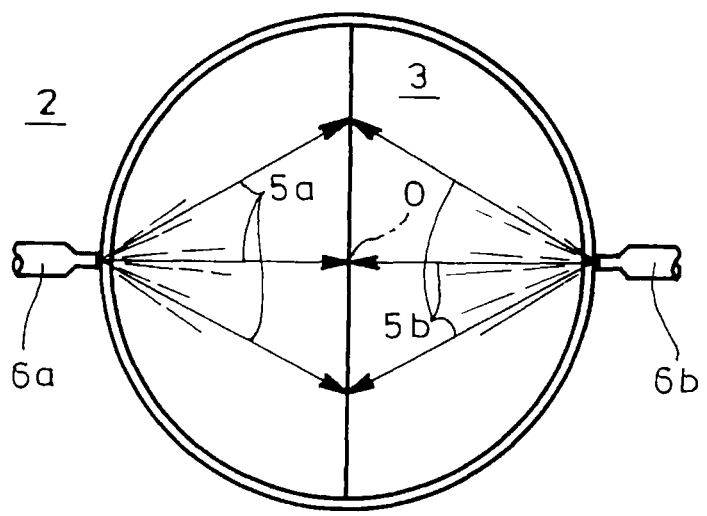
FIG. 2 is a plan view of FIG. 1.

In the diesel engine 1, when the piston 3 reaches the vicinity of the upper dead center during the compression stroke, fuel 5a, 5b. is injected from the nozzle holes 8a and 8b. of the fuel injection valves 6a. and 6b, respectively, into the combustion chamber 4 crosswise of the combustion chamber 4 and the suction valve (not shown) is opened to introduce air into the combustion chamber 4. Thus, in the initial stage of fuel injection where the piston 3 is in the vicinity of the upper dead center, the fuel 5a, 5b. proceeds divergently as it advances as shown in FIG. 2. As shown in FIG. 1, the fuel 5a. proceeds substantially horizontally whereas the fuel 5b. proceeds substantially horizontally and then changes its direction along the slant 3a. of the piston 3 to proceed slantwise upwardly along the slant 3a.

As a result, the fuel 5a, 5b. collides with each other diametrically centrally of the cylinder 2 and its advance velocities cancel out each other and an involved air amount is restricted, so that the combustion becomes moderate. Thus, the injected fuel 5a, 5b. may be stably ignited, so that the combustion temperature of the fuel 5a, 5b. does not become enhanced and $NO_x$. in the exhaust gas is reduced.

Figure 3:
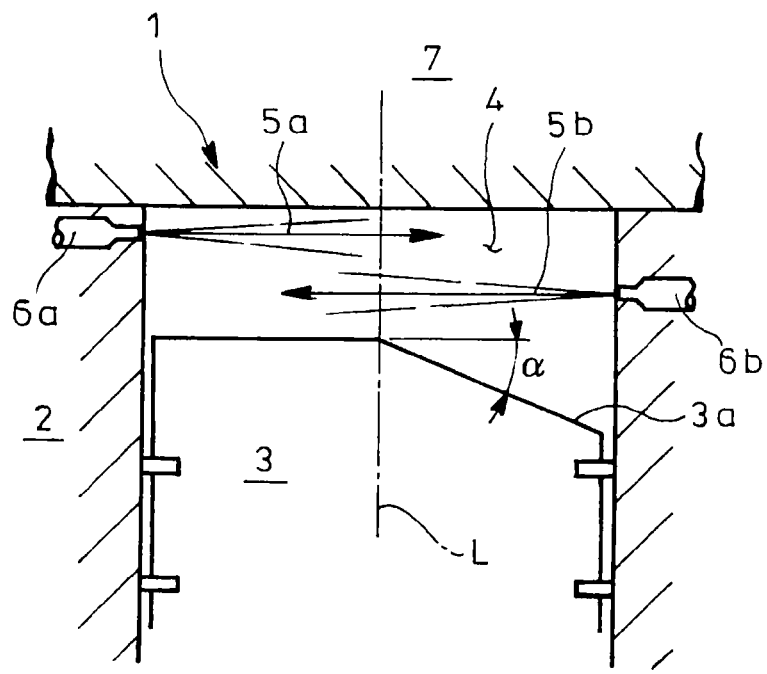
FIG. 3 shows a front view in section of the embodiment of a fuel injection method for a diesel engine and a diesel engine according to the invention in a late stage of fuel injection where the piston is lowered from the vicinity of the upper dead center by a predetermined distance.
Figure 4:
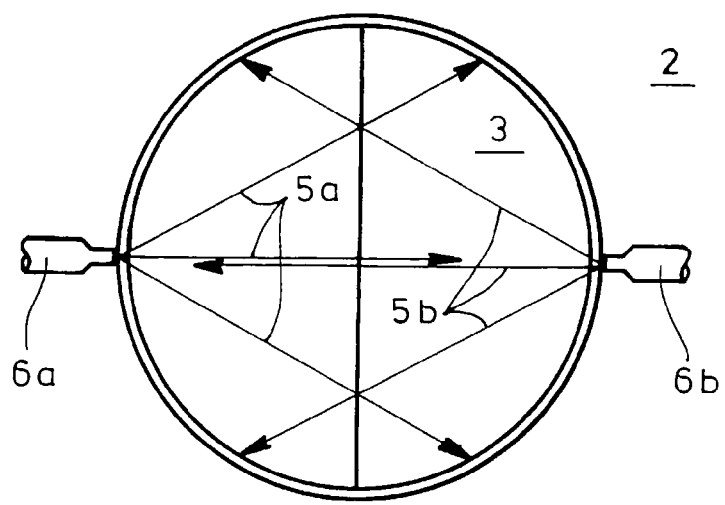
FIG. 4 is a plan view of FIG. 3.

In the late stage of fuel injection where the piston 3 is lowered by a predetermined distance in transition of the diesel engine 1 from the compression stroke into the expansion stroke, the injected fuel 5a, 5b. from the fuel injection valves 6a. and 6b. proceeds across the combustion chamber 4 toward the opposing wall portions as shown in FIG. 3; there is no confliction between the fuel 5a, 5b. As a result, air is satisfactorily mixed with the fuel 5a, 5b, so that the fuel 5a, 5b. is burned well to reduce the particulate matter in the exhaust gas.

According to the embodiment of the invention, in the initial stage of fuel injection, the involvement of air into the fuel 5a, 5b. is restricted so that flame temperature is prevented from being enhanced and $NO_x$. in the exhaust gas can be reduced. In the late stage of fuel injection, air can be sufficiently involved into the injected fuel 5a, 5b, so that the combustion becomes satisfactory to reduce the particulate matter.

A fuel injection method for a diesel engine and a diesel engine according to the invention have been described with respect to a case where the fuel is directly injected from the fuel injection valves into the combustion chamber. It is to be understood that various changes and modifications may be made without departing from the scope of the invention. For example, the invention may be carried out in such a manner that arranged diametrically oppositely of the cylinder are auxiliary chambers through which the injected fuel is introduced from the fuel injection valves into the combustion chamber.

The invention claimed is:

1. A fuel injection method for a diesel engine with fuel injection valves for injection of fuel into a combustion chamber,
   characterized in that it comprises injecting the fuel crosswise of the combustion chamber from the plural fuel injection valves arranged horizontally and diametrically oppositely of the combustion chamber in a plan view and arranged out of alignment axially of the combustion chamber, the fuel injected from the fuel injection valve close to a cylinder head colliding with the fuel injected from the fuel injection valve away from the cylinder head to rise along a slant on a piston with a rising gradient from a side adjacent to the fuel injection valve away from the cylinder head toward a side adjacent to the fuel injection valve close to the cylinder head up to diametrically halfway of the piston when the piston is in a vicinity of an upper dead center during a compression stroke, the fuel injected from the respective fuel injection valves advancing toward opposing wall portions in the combustion chamber when the piston is lowered by a predetermined amount during an expansion stroke.

2. A diesel engine with fuel injection valves for injecting fuel into a combustion chamber, characterized by comprising the fuel injection valves arranged horizontally and diametrically oppositely of the combustion chamber in a plan view and arranged out of alignment axially of the combustion chamber, and a piston with an upper surface having a rising gradient extending from a side adjacent to the fuel injection valve away from a cylinder head toward a side adjacent to the fuel injection valve close to the cylinder head up to diametrically halfway of the piston.

* * * * *